C. J. ROOS.
INTERNAL COMBUSTION ENGINE.
APPLICATION FILED JULY 2, 1919.
1,361,619.
Patented Dec. 7, 1920.
5 SHEETS—SHEET 3.
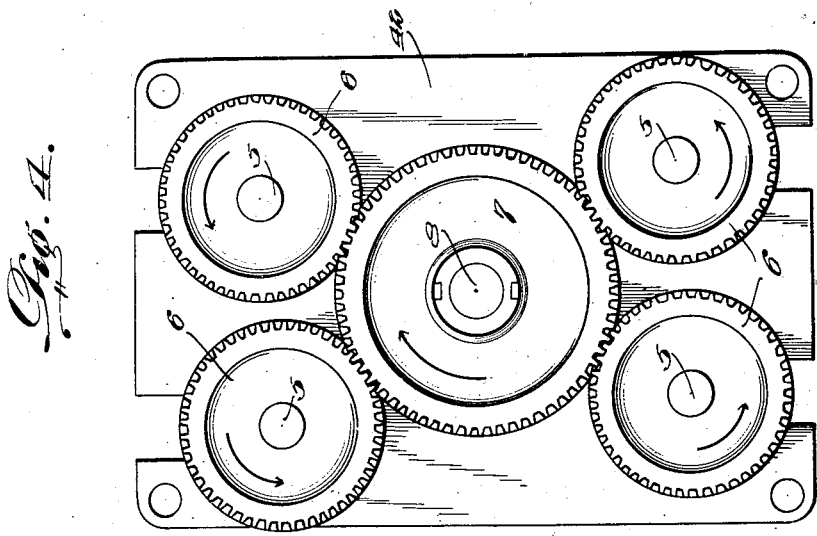
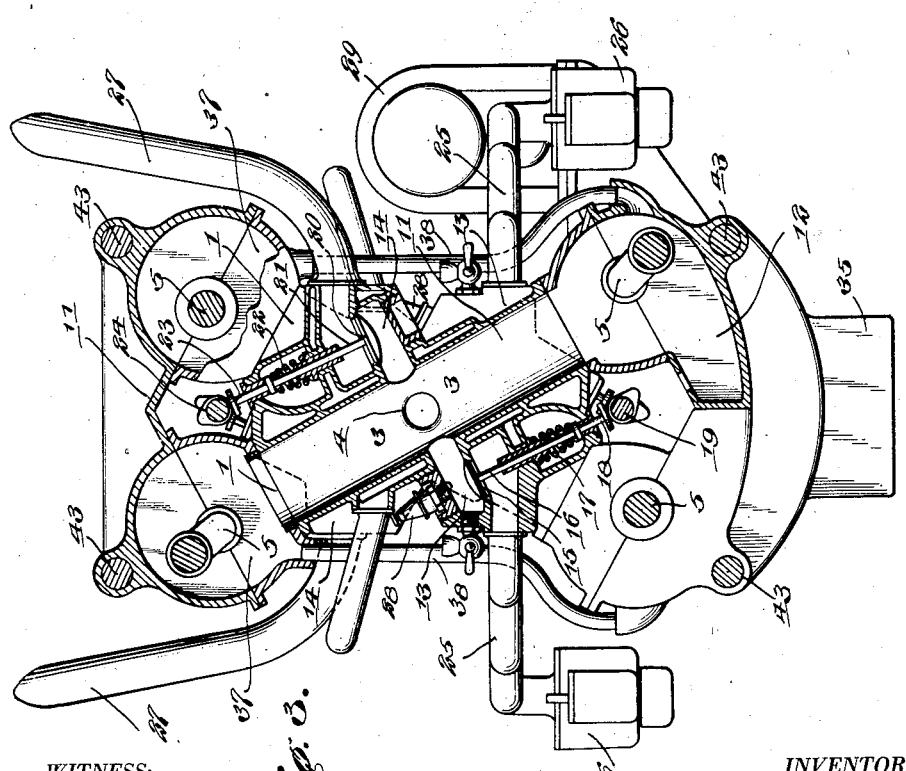
WITNESS:
INVENTOR.
C. J. Roos.
BY
Victor J. Evans.
ATTORNEY.

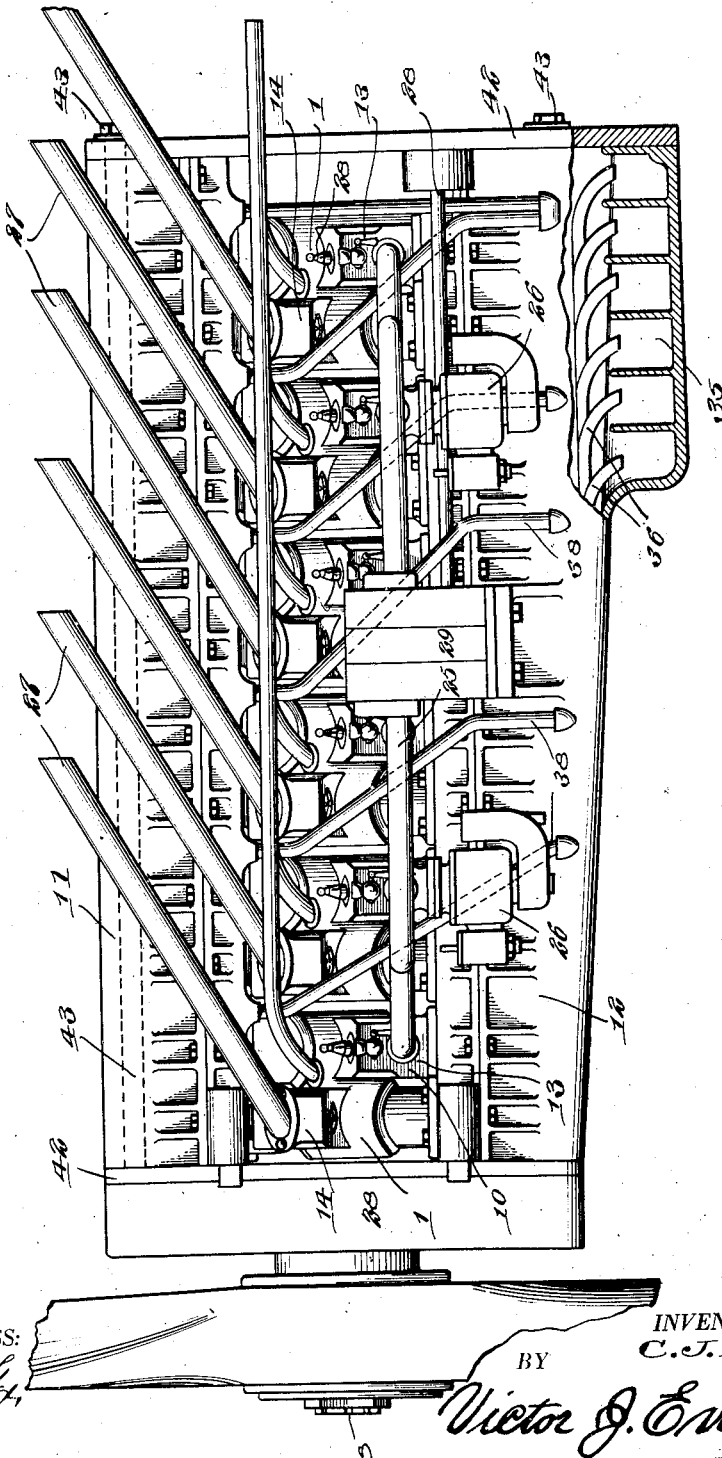

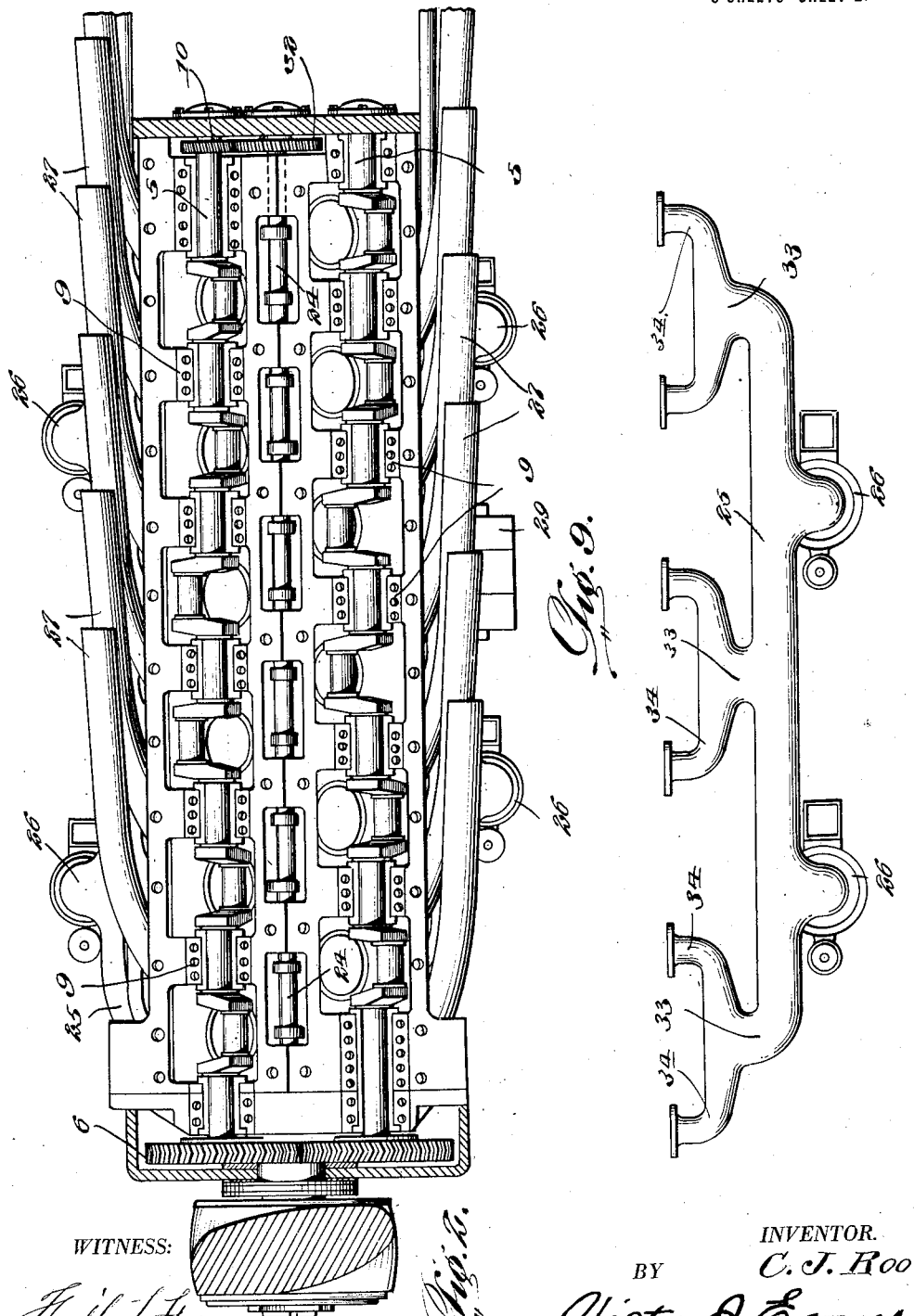

C. J. ROOS.
INTERNAL COMBUSTION ENGINE.
APPLICATION FILED JULY 2, 1919.
1,361,619.
Patented Dec. 7, 1920.
5 SHEETS—SHEET 4.
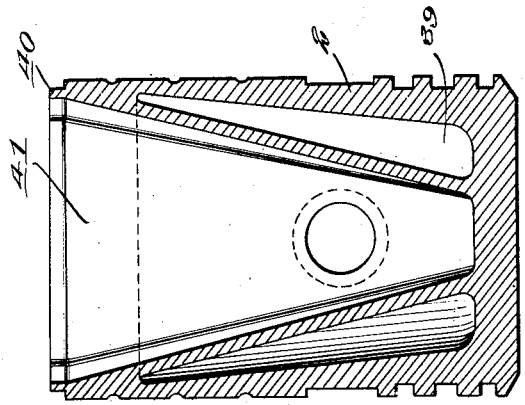
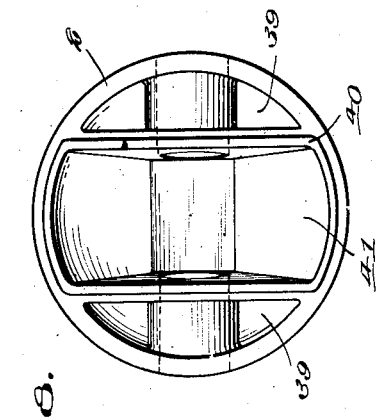
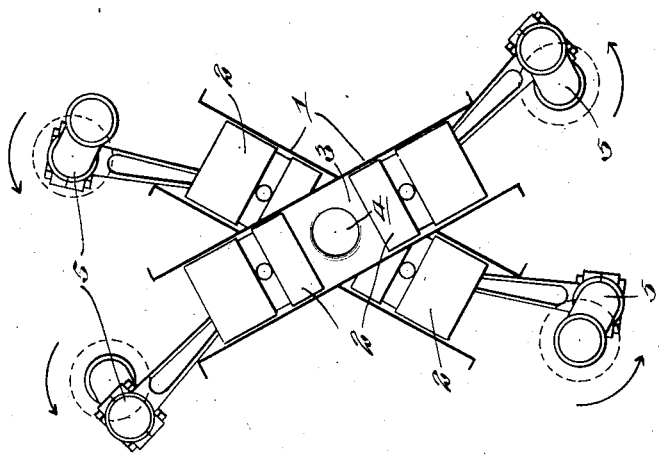
WITNESS:
INVENTOR.
C. J. Roos.
BY
ATTORNEY.

C. J. ROOS.
INTERNAL COMBUSTION ENGINE.
APPLICATION FILED JULY 2, 1919.
1,361,619.
Patented Dec. 7, 1920.
5 SHEETS—SHEET 5.
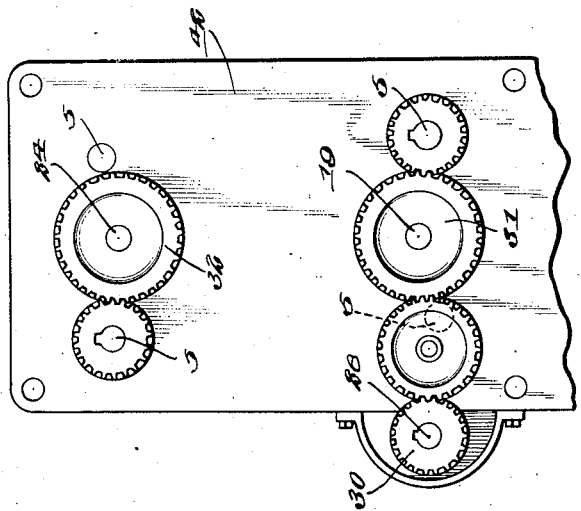
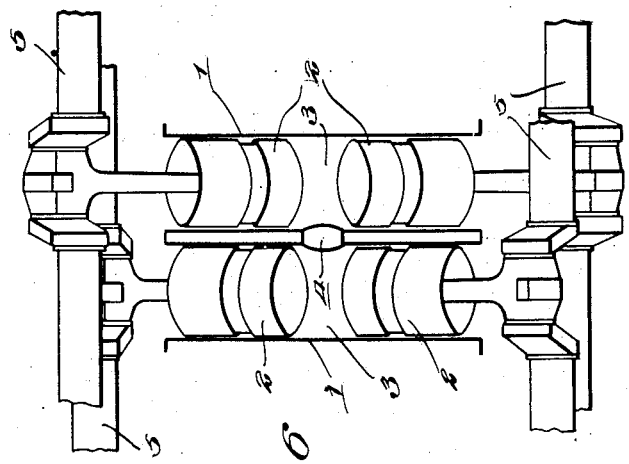
WITNESS:
INVENTOR.
C. J. Roos.
BY
ATTORNEY.

UNITED STATES PATENT OFFICE.

CHARLES JOHANNES ROOS, OF CHICAGO, ILLINOIS.

INTERNAL-COMBUSTION ENGINE.

1,361,619.   Specification of Letters Patent.   Patented Dec. 7, 1920.

Application filed July 2, 1919. Serial No. 308,166.

*To all whom it may concern:*

Be it known that I, CHARLES JOHANNES Roos, a citizen of the United States, residing at Chicago, in the county of Cook and State of Illinois, have invented new and useful Improvements in Internal-Combustion Engines, of which the following is a specification.

This invention relates to internal combustion engines of the multiple cylinder type, the broad object in view being to produce an engine of the kind referred to in which the cylinders are arranged in a novel relation to each other, each cylinder containing two working pistons moving simultaneously in opposite directions and each cylinder being open at both ends thereof, the cylinders being combined with four crank shafts arranged at the outer ends of the cylinders and connected with the adjacent pistons, the power generated by the pistons and delivered to the crank shafts being transmitted to a common power delivering element driven preferably at reduced speed as compared with the speed of rotation of the crank shaft.

A further object of the invention is to produce an engine embodying any desired number of power units, each unit comprising a pair of cylinders arranged side by side and in X formation and having their central portions which constitute the compression chambers in free open communication with each other at all times whereby a better mixture is obtained with the use of a plurality of carbureters or fuel mixing devices, equal pressure and impulse being thus delivered to four working pistons operating in said two cylinders, and the exhaust taking place at both sides of the engine.

With the above and other objects in view, the invention consists in the novel construction, combination and arrangement of parts herein fully described, illustrated and claimed.

In the accompanying drawings:—

Figure 1 is a side elevation of the internal combustion engine.

Fig. 2 is a plan view of the same.

Fig. 3 is an end elevation thereof with certain parts in section.

Fig. 4 is an end view of the engine showing reducing gear.

Fig. 5 is a transverse sectional diagrammatic view showing the cylinders of one power unit and the arrangement of the crank shafts.

Fig. 6 is also a diagrammatic view of the same part taken at a right angle to Fig. 5.

Fig. 7 is a diagrammatic sectional view of one of the upper pistons.

Fig. 8 is an end elevation of the same.

Fig. 9 is a plan view of one of the intake manifolds showing a plurality of carbureters connected therewith.

Fig. 10 is a detail view showing parts of the gearing.

The improved engine as a whole is composed of any desired number of power units according to the size and power of the engine and the purpose or use for which the same is designed. Each power unit comprises a pair of cylinders 1 arranged side by side in X formation or double V formation as clearly shown in Fig. 3 and also in the diagrammatic view in Fig. 5, the arrangement of the cylinders side by side being shown in the diagrammatic view in Fig. 6. Each of the cylinders 1 is open at both ends and working in conjunction with each cylinder is a pair of pistons 2 which are arranged to work simultaneously in opposite direction, being driven outwardly by an explosion taking place in the center of the cylinders between the pistons, the compression chambers 3 remaining between the pistons when at their innermost points communicating with each other by means of the ports 4, and as said compression chambers are supplied by a plurality of carbureters as shown in the drawings, the combined supply from said carbureters is thoroughly mixed in the compression chambers. The exhaust also takes place at opposite sides of the power unit as will hereinafter appear. In connection with the cylinders hereinabove referred to and arranged as shown and described, I employ four crank shafts 5 arranged beyond the outer extremities of the cylinders as shown, and having their centers laterally offset with respect to the longitudinal axes of the cylinders and pistons as clearly shown in Fig. 5. This arrangement results in obtaining greater leverage on the crank shaft during the power impulse of the piston and this adds to the efficiency of the engine. The length of the crank shaft will vary of course in accordance with the number of power units employed, each crank shaft extending practically throughout the length of the engine. The cranks of the crank shafts are offset from each other and arranged in a manner similar to the present day six cylinder automobile engine. Furthermore, the cycles of operation are arranged the same as in the present day six cylinder engine in practice.

Each crank shaft 5 has fast on one end thereof a gear 6 and all of the gears 6 mesh with a common center gear 7 which is fast on a common power delivery element or shaft 8. In the preferred embodiment of the invention, the gear 7 is of greater diameter and number of teeth than the gear 6. This forms a reducing gearing by means of which the final power delivery shaft is driven at a lower speed than the crank shaft 5. This particularly adapts the engine for air craft and marine work. Each of the cranks is mounted in a plurality of bearings 9, there being one bearing 9 between each adjacent pair of cranks as shown in Fig. 1. The main body of the engine comprises a cylinder block 10, a separable upper crank casing 11 and a separable lower crank case 12, said members being suitably flanged and bolted or otherwise secured together. Each cylinder is provided with an inlet valve chamber 13 at one side thereof and is also provided with an exhaust valve chamber 14 at the opposite side thereof, said valve chambers being located centrally of the cylinders as shown for example in Fig. 3. Each inlet valve chamber 13 is controlled by an inlet or intake valve 15 having a downwardly extending valve stem 16 said valve being held normally closed or seated by means of a spring 17. The stem 16 is actuated by means of a push rod 18 to which motion is imparted by a cam shaft 19 located below the cylinders as shown in Fig. 3. It will be noted in Fig. 3 that the valve stems 16 converge downwardly so that a single shaft 19 serves to operate all of the intake valves. The exhaust valve chamber 14 is controlled by an exhaust valve 20, the stem 21 of which extends upwardly and inclined inwardly, said exhaust valve being seated by means of a spring 22 and the stem of the valve being actuated by a push rod 23 which in turn is operated by an upper cam shaft 24, the latter serving to operate all of the exhaust valves, the stems of the said valves converging upwardly toward said upper cam shaft 24, as shown in Fig. 3. It will thus be seen that I employ only two cam shafts for all of the intake and exhaust valves of the engine, the cams of said shafts being of course properly arranged and timed to effect the opening and closing of said intake and exhaust valves at the proper moment. Oppositely arranged intake manifolds 25 conduct explosive mixture to the intake valve chambers 13 from a plurality of carbureters 26 arranged on opposite sides of the engine as shown and the exhaust is delivered from the oppositely located exhaust valve 14 to the exhaust manifolds 27 at the opposite sides of the engine as also shown in Fig. 3. Each inlet valve chamber 13 is furnished with a spark plug 28 or the equivalent thereof. The shaft 28 of the magneto 29 has a gear 30 fast thereon which meshes with one of the gears 6 and the cam shafts 19 and 24 are driven by means of gears 31 and 32 fast thereon and meshing with the gears as shown in Fig. 4. Each manifold 25 is supplied by two carbureters 26 as shown in Fig. 9 and is provided with three branches 33, each branch being bifurcated or provided with two branches 34 when used in conjunction with a 12 cylinder engine as illustrated in the accompanying drawing. Where less than 12 cylinders are employed, the number of branches or legs of the intake manifolds will of course be correspondingly varied.

The lubricating system comprises a reservoir or sump 35 arranged at the bottom of the engine as shown in Fig. 1, suitable pressure being obtained in the reservoir to force the oil through a series of pipes 36 into oil pockets in which the lower crank connecting rod bearings dip as in the ordinary splash system of lubrication, some of the pipes or tubes 36 leading into an upper reservoir 37 so as to supply the upper crank shaft, superfluous oil overflowing and returning to the reservoir through pipes or tubes 38. In order to provide for lubrication of the upper cylinder wall and upper crank shafts and in order to further prevent an excess amount of oil from passing by the upper pistons and getting into the crank case or main cylinder slot, each of the upper pistons is formed with segmental side pockets 39 as shown in Figs. 7 and 8, this effect and result being further carried out by means of an upwardly extending flange 40 on the piston surrounding the transversely elongated space 41 in which the adjacent or respective connecting rods work. At the opposite ends of the engine are end plates 42 and passing through said end plates are tie bolts 43 which also extend entirely through the cylinder block as indicated in Fig. 1.

From the foregoing description taken in connection with the accompanying drawing, it will now be understood that each power unit of the engine comprises a pair of cylinders arranged in X formation and each containing two oppositely moving pistons with centrally arranged compression chambers which are in free open inter-communication with each other. It will also be seen that a plurality of crank shafts are simultaneously driven and rotated in the same direction and the combined energy of said crank shafts is transmitted by reducing gearing to a common power delivering element. It will be further understod that by arranging the cylinders in opposed position as shown in the drawings, the inertia of the oppositely moving pistons is automatically compensated for thereby reducing vibration of the engine to a minimum and particularly adapting the engine for aircraft. The power generated by the explosion in the cylinders is equally distributed to all of the crank shafts. Each explosion is distributed on four pistons thereby providing much greater flexibility than can be obtained by the ordinary single piston in the single cylinder arrangement. In effect only one compression or explosion chamber is used for four pistons, this being due to the fact that the compression chambers of two adjacent cylinders are in open free communication with each other at all times. It is to be understood that the engine may be composed of any desired number of units and therefore such engine may be made to comprise two cylinders or any multiple of two cylinders, but in each case there will be two oppositely moving pistons in each of said cylinders, and there will also be four crank shafts arranged as described and shown and all geared to a single power delivering element preferably by reducing gearing. This enables the pistons to operate at high speed while driving the final power delivering element at the speed for which the engine was designed.

From the foregoing description, taken in connection with the accompanying drawings, it will be seen that I have produced a light weight motor having a fairly low compression for aeronautical motors, thereby insuring cool valve and a cool running motor with a minimum of parts which are capable of being more easily machined or produced; also reducing vibration to a minimum, an important item in aeroplane practice, and at the same time producing perfect team work of a multiple cylinder engine including an unusually high piston travel speed. One of the main advantages of the invention resides in the use of a single compression space or chamber for a plurality of cylinders. In this way a perfectly even distribution of power is obtained for the several cylinders and pistons, also effecting a great saving in the number of parts and simplicity of construction and operation. Furthermore, a more perfect equalization of impulses is obtained due to the single compression space for a plurality of cylinders. This is a great advantage over a multiple cylinder engine in which the several impulses are obtained by a separate explosion. The common compression chamber for a plurality of cylinders is thus in perfect team work of the cylinders and renders the engine more reliable in operation. Furthermore, it reduces the strain on the ignition system by substantially fifty per cent., thereby rendering the ignition more reliable. Another advantage resides in the multiple carbureter and fuel intake construction controlled by a single throttle lever, the mixture being formed from the plurality of carbureters into a single mixing and compression chamber and thereby insuring a proper mixture even though one of the carbureters should not be in perfect working condition.

Having thus described the invention what is claimed is:—

1. In an internal combustion engine, a power unit embodying a plurality of cylinders arranged side by side at angles to each other and having intercommunicating compression chambers, and two oppositely moving pistons in each of said cylinders, and four crank shafts located beyond the outer ends of said cylinders and having the adjacent pistons connected therewith.

2. In an internal combustion engine, a power unit embodying a plurality of cylinders arranged side by side at angles to each other and having intercommunicating compression chambers, and two oppositely moving pistons in each of said cylinders, and four crank shafts located beyond the outer ends of said cylinders and having the adjacent pistons connected therewith, and a power delivery member to which the energy of all of said crank shafts is transmitted.

3. In an internal combustion engine, a power unit embodying a plurality of cylinders arranged side by side at angles to each other and having intercommunicating compression chambers, and two oppositely moving pistons in each of said cylinders, and four crank shafts located beyond the outer ends of said cylinders and having the adjacent pistons connected therewith, and a power delivery member to which all of said crank shafts are connected by reducing gears.

4. In an internal combustion engine, a power unit embodying a plurality of cylinders arranged side by side at angles to each other and having intercommunicating compression chambers, and two oppositely moving pistons in each of said cylinders, and four crank shafts located beyond the outer ends of said cylinders and having the adjacent pistons connected therewith, and a power delivery member to which all of said crank shafts are connected by reducing gears, puppet valves for said cylinders, and two cam shafts for operating said valves, the stems of said valves converging outwardly toward the respective cam shafts.

5. In an internal combustion engine, two cylinders arranged side by side in X formation, each cylinder being open at both ends and in communication centrally and laterally with the companion cylinder, two oppositely movable pistons in each cylinder and an energy delivering member to which the power of all of said pistons is transmitted.

6. In an internal combustion engine, two cylinders arranged side by side in X formation, each cylinder being open at both ends and in communication centrally and laterally with the companion cylinder, two oppositely movable pistons in each cylinder, four crank shafts arranged beyond the outer ends of said cylinders and having the respective pistons connected therewith, and a power delivering member geared to all of said crank shafts to rotate at a speed lower than the speed of said crank shafts.

7. In an internal combustion engine, a power unit embodying a plurality of cylinders arranged side by side at angles to each other and having intercommunicating compression chambers, and two oppositely moving pistons in each of said cylinders, and four crank shafts located beyond the outer ends of said cylinders and having the adjacent pistons connected therewith, and a power delivery member to which all of said crank shafts are connected by reducing gears, puppet valves for said cylinders, and two cam shafts for operating said valves, the stems of said valves converging outwardly toward the respective cam shafts, and a plurality of carbureters in communication with the communicating central portions of said cylinders.

8. In an internal combustion engine, a power unit embodying a plurality of cylinders arranged side by side at angles to each other and having intercommunicating compression chambers, and two oppositely moving pistons in each of said cylinders, and four crank shafts located beyond the outer ends of said cylinders and having the adjacent pistons connected therewith, and a power delivery member to which all of said crank shafts are connected by reducing gears, puppet valves for said cylinders, and two cam shafts for operating said valves, the stems of said valves converging outwardly toward the respective cam shafts, and a plurality of carbureters in communication with the communicating central portions of said cylinders, and exhaust pipes arranged at opposite sides of said cylinders and in communication with the communicating central portions thereof.

9. In an internal combustion engine, a power unit embodying a plurality of cylinders arranged side by side at angles to each other and having intercommunicating compression chambers, and two oppositely moving pistons in each of said cylinders, and four crank shafts located beyond the outer ends of said cylinders and having the adjacent pistons connected therewith, said crank shafts being offset laterally with relation to the longitudinal axis of the respective pistons and cylinders.

In testimony whereof I affix my signature.

CHARLES JOHANNES ROOS.